United States Patent
Carlson et al.

(10) Patent No.: US 6,999,958 B2
(45) Date of Patent: Feb. 14, 2006

(54) RUNTIME QUERY OPTIMIZATION FOR DYNAMICALLY SELECTING FROM MULTIPLE PLANS IN A QUERY BASED UPON RUNTIME-EVALUATED PERFORMANCE CRITERION

(75) Inventors: David Glenn Carlson, Rochester, MN (US); Kevin James Kathmann, Rochester, MN (US); Lawrence Kenneth Nash, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 10/165,025

(22) Filed: Jun. 7, 2002

(65) Prior Publication Data

US 2003/0229639 A1 Dec. 11, 2003

(51) Int. Cl.
*G06F 17/30* (2006.01)

(52) U.S. Cl. .................. 707/3; 707/1; 707/4; 707/5
(58) Field of Classification Search ............. 707/1–5, 707/100–101, 102
See application file for complete search history.

(56) References Cited

U.S. PATENT DOCUMENTS

| | | | |
|---|---|---|---|
| 5,412,804 A | 5/1995 | Krishna | |
| 6,064,816 A | 5/2000 | Parthasarathy et al. | |
| 6,263,328 B1 | 7/2001 | Coden et al. | |
| 6,289,334 B1 | 9/2001 | Reiner et al. | |
| 6,314,430 B1 | 11/2001 | Chang | |
| 2002/0035559 A1 * | 3/2002 | Crowe et al. | 707/2 |
| 2003/0187858 A1 * | 10/2003 | Kirk et al. | 707/100 |
| 2003/0208489 A1 | 11/2003 | Todd | |

OTHER PUBLICATIONS

G. Mitchell, "Extensible Query Processing in an Object–Oriented Database," May 1993, Thesis, Department of Computer Science, Brown University, pp. 1–166.

IBM Patent Application filed on even date herewith by Carlson et al., "Parallel Database Query Processing for Non–Uniform Data Sources via Buffered Access".

IBM Patent Application filed on even date herewith by Carlson et al., "Method for Efficient Processing of Multi-State Attributes".

IBM Patent Application filed on even date herewith by Carlson et al., "Object–Oriented Query Execution Data Structure".

* cited by examiner

*Primary Examiner*—Alford W. Kindred
(74) *Attorney, Agent, or Firm*—Wood, Herron & Evans, LLP

(57) ABSTRACT

An apparatus, program product and method perform runtime query optimization during execution of a query to select from among multiple available plans, or implementations, capable of implementing the query. The runtime query optimization utilizes a runtime-derived performance criterion to dynamically select from among multiple query implementations. A performance criterion is dynamically evaluated during execution of at least a portion of a query, and one of a plurality of query implementations defined in the query is selected based upon the dynamically-evaluated performance criterion. Once selected, execution of the query is continued using the selected query implementation.

23 Claims, 9 Drawing Sheets

```
                        INNER JOIN NODE
NODE DATA MEMBERS:
    XLEFTCHILD    //POINTER TO LEFT CHILD NODE
    XRIGHTCHILD   //POINTER TO RIGHT CHILD NODE
    XFETCHLEFT    //FLAG INITIALLY SET TO "TRUE"

NODE LOGIC:
  FOR (;;) {
      IF (XFETCHLEFT) {
          STATUS=XLEFTCHILD.EXECUTE()
          IF(STATUS==TRUE) {
              XRIGHTCHILD.POSITIONBEFORESTART()  //RESET RIGHT CHILD
              STATUS=XRIGHTCHILD.EXECUTE()
              IF(STATUS==TRUE) {
                  XFETCHLEFT=FALSE
                  BREAK                          //RETURN TO CALLER, HIT ON RIGHT SUBTREE
              }
              ELSE
                  CONTINUE;                      //LOOP AGAIN
          }
          ELSE BREAK;
      }
      ELSE {
          STATUS=XRIGHTCHILD.EXECUTE()
          IF(STATUS==TRUE)
              BREAK;                             //RETURN TO CALLER, HIT ON RIGHT SUBTREE
          ELSE
              XFETCHLEFT=TRUE;                   //RIGHT SUBTREE EXHAUSTED, RETURN TO LEFT
      }
```

FIG. 5B

```
                                                              ┌─ 138'
                    INDEX PROBE NODE
NODE DATA MEMBERS:
   XINDEX    //POINTER TO INDEX BUILD OVER COUNTRY TABLE - CREATED FROM
             //"CREATE INDEX COUNTRY.INDEX ON COUNTRY_TABLE(LOCATION,COUNTRY)"
   XAOL      //AOL

NODE LOGIC:
   KEY@=ADA[7]
    IF (XINDEX.FINDNEXT(KEY@)==TRUE
    {
       STATUS=XAOL.EXECUTE(KEY@)
    }
    ELSE                                              ┌─ 142'
       STATUS=FALSE
    RETURN STATUS
```

| INDEX | OP TYPE | LOGIC |
|---|---|---|
| 0 | RETURN | RETURN TRUE |

| ATTRIBUTE DESCRIPTOR ARRAY | | | | |
|---|---|---|---|---|
| INDEX | TYPE | | VAL. PTR. | |
| 0 | CHAR | | | → EMPLOYEE.LASTNAME |
| 1 | CHAR | | | → EMPLOYEE.FIRSTNAME |
| 2 | DEC | | | → EMPLOYEE.SALARY |
| 3 | CHAR | ○ ○ ○ | | → EMPLOYEE.LOCATION |
| 4 | CHAR | | | → COUNTRY.COUNTRY |
| 5 | CHAR | | | → 50,000 |
| 6 | DEC | | | → "USA" |
| 7 | CHAR | | | → KEY BUILD BUFFER |

| INDEX | OP TYPE | LOGIC |
|---|---|---|
| 0 | SAD | SET ADA[0].VALPTR=RECORD@->LASTNAME@ |
| 1 | SAD | SET ADA[1].VALPTR=RECORD@->FIRSTNAME@ |
| 2 | SAD | SET ADA[2].VALPTR=RECORD@->SALARY@ |
| 3 | SAD | SET ADA[3].VALPTR=RECORD@->LOCATION@ |
| 4 | LOGIC | IF *ADA[2].VALPTR > *ADA[5].VALUEPTR GOTO 5 ELSE GOTO 8 |
| 5 | KEYBUILD | APPEND KEYBUILD OF ADA[3] TO ADA[7] |
| 6 | KEYBUILD | APPEND KEYBUILD OF ADA[4] TO ADA[7] |
| 7 | RETURN | RETURN TRUE |
| 8 | RETURN | RETURN FALSE |

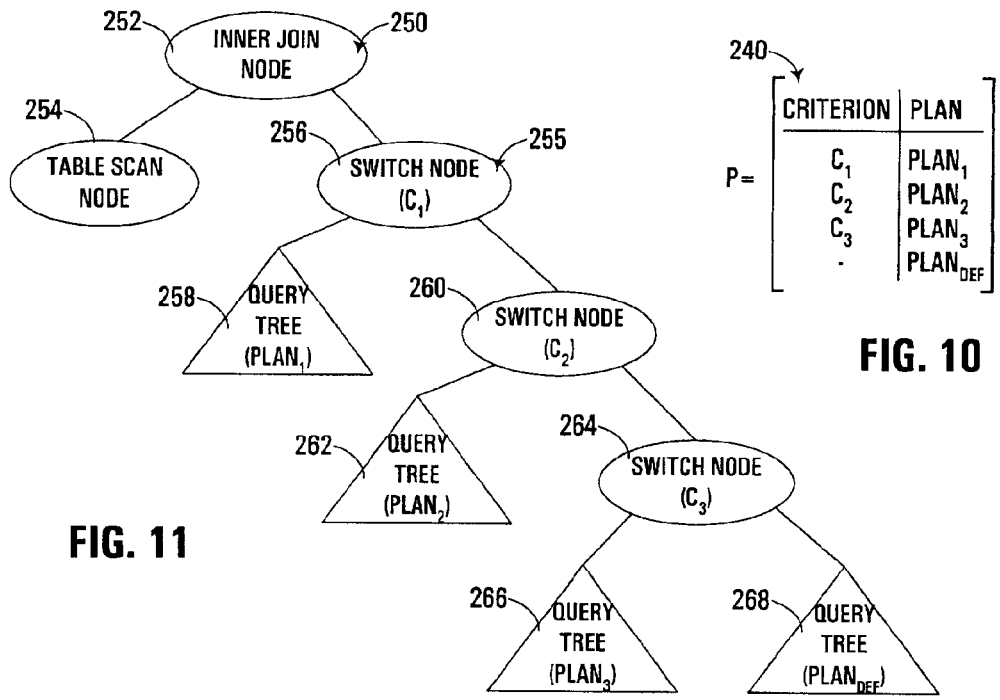
FIG. 11
FIG. 10
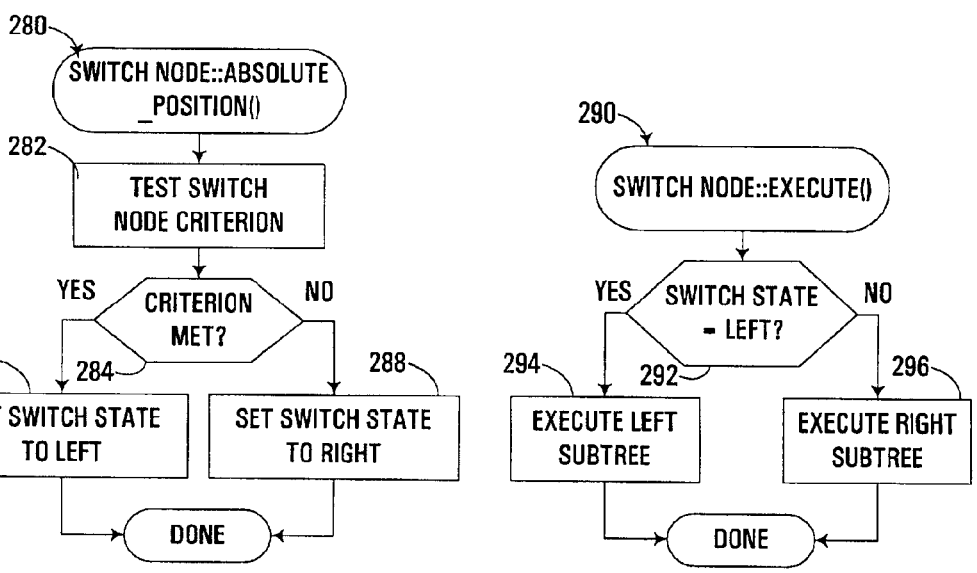
FIG. 12
FIG. 13

RUNTIME QUERY OPTIMIZATION FOR DYNAMICALLY SELECTING FROM MULTIPLE PLANS IN A QUERY BASED UPON RUNTIME-EVALUATED PERFORMANCE CRITERION

CROSS-REFERENCE TO RELATED APPLICATIONS

This application is related to U.S. Ser. No. 10/165,235, filed on even date herewith by David Glenn Carlson et al. and entitled "PARALLEL DATABASE QUERY PROCESSING FOR NON-UNIFORM DATA SOURCES VIA BUFFERED ACCESS" (hereinafter "Carlson I") (IBM ROC920010234US1), to U.S. Ser. No. 10/164,767, filed on even date herewith by David Glenn Carlson et al. and entitled "METHOD FOR EFFICIENT PROCESSING OF MULTI-STATE ATTRIBUTES" (hereinafter "Carlson II") (IBM ROC920010305US1), and to U.S. Ser. No. 10/165,293, filed on even date herewith by David Glenn Carlson et al. and entitled "OBJECT-ORIENTED QUERY EXECUTION DATA STRUCTURE" (hereinafter "Carlson III") (IBM ROC920020104US1). The disclosures of each of these applications are incorporated by reference herein.

FIELD OF THE INVENTION

The invention relates to database management systems, and in particular, to query execution and optimization.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

Many conventional database management systems, for example, are inherently interpretive systems, where queries are written in an interpretive language such as SQL, and dynamically interpreted by a query engine during query execution. Runtime interpretation in a computer environment, however, almost always results in reduced performance as compared to direct execution of executable code. Other conventional database management systems have attempted to reduce the amount of interpretation required to execute a query, typically by generating queries that comprise assembled blocks of code, such that a query engine needs only to select and execute code blocks that correspond to particular query instructions.

In addition, many conventional database management systems incorporate query optimizers, which operate to optimize the performance of a query to be executed by a query engine. Such query optimizers often operate by selecting from among multiple "plans", or possible implementations of a query, so as to execute the query with the greatest efficiency.

As an example, in a relational database, data is stored in tables, where the rows, or entries, in the tables generally correspond to data records, and the columns generally correspond to the fields in each data record. Thus, for example, in a table that stores information about a company's employees, the table may include columns, or fields, representing first name, last name, location, salary, etc., with each row representing each record in the table.

To perform a search of a table to locate records that match a particular criterion, a table can often be analyzed using either scan probes or index probes. A scan probe operates more or less by sequentially stepping through each record in a table to find matching records, while an index probe is keyed off of an index that is generated for the table. A scan probe is typically more efficient when a large number of records match the criterion, while an index probe (which has additional overhead associated with generating the index) is typically more efficient when only a small number of records match the criterion.

Thus, using the above example, assuming a query was directed to finding all employees that had a salary below $50,000, assuming that most employees had a salary below that range, a scan probe would typically be more efficient than an index probe. On the other hand, assuming a query was directed to finding all employees having a first name of "David", an index probe would typically be more efficient, as the overhead associated with indexing the records based upon first name would be offset by the ability to directly lookup the relatively few number of records that matched the criterion.

Query optimizers typically rely on statistics, developed over time, to select among multiple plans so that the most efficient plan for a particular type of query would be selected. Therefore, a query optimizer in the aforementioned example might recognize that a query directed to the salary field typically generates a large number of matching records, and as such, a scan probe-based plan would be the most appropriate for queries directed to the salary field. Likewise, such a query optimizer might recognize that a query directed to the first name field typically generates a small number of matching records, and as such, an index probe-based plan would be the most appropriate for queries directed to the first name field.

In many circumstances, however, a query optimizer may not be able to determine, during optimization, which type of plan is most efficient for a particular situation. In particular, often the statistics required to make a reasoned decision are only available at runtime, and thus after query optimization has already occurred.

As an example, consider a given query that includes a selection based upon a pattern string that can change during query execution. Based upon what pattern string is used during query execution, precisely which plan is more efficient may change. For instance, in the above example, if a pattern string such as "Dav %" on a first name field is used, an index scan may be the most efficient. However, if a pattern string such as "% id", where the string is based upon non-leading characters, is used on the first name field, an index scan would not be appropriate. Instead, a table scan would need to be used. Therefore, if the pattern string that is supplied to a query can change during runtime, the query optimizer would not be able to select one of the plans, and would need to default to one plan that is most likely suboptimal in some situations.

In addition, other factors, known only at runtime, may affect which plan is most efficient to implement a given query. For example, different plans may utilize computer resources to various degrees, e.g., one plan is processor intensive, while another is less processor intensive, but requires a comparatively greater amount of working storage. Given that the workload of a database management system may vary from time to time, different plans could work better than others based upon system workload. However, factors such as system workload will generally not be known until query runtime, so a query optimizer could not use performance data such as workload or free storage in selecting an optimal plan to implement a query.

So long as the types of statistics available for use by a query optimizer are limited to those capable of being derived at optimization time, a query optimizer is effectively hampered in its ability to select the most appropriate plan to implement a given query. Therefore, a significant need exists in the art for a manner of optimizing the execution of a query that is capable of making use of a wider variety of statistics in selecting optimal plans for implementing a query.

SUMMARY OF THE INVENTION

The invention addresses these and other problems associated with the prior art by providing an apparatus, program product and method in which runtime query optimization is performed during execution of a query to select from among multiple available plans, or implementations, capable of implementing the query.

Consistent with the invention, the runtime query optimization utilizes a runtime-derived performance criterion to dynamically select from among multiple query implementations. In particular, a performance criterion is dynamically evaluated during execution of at least a portion of a query, and one of a plurality of query implementations defined in the query is selected based upon the dynamically-evaluated performance criterion. Once selected, execution of the query is continued using the selected query implementation.

As will become more apparent below, a wide variety of performance criteria may be utilized to aid in runtime query optimization consistent with the invention. Statistics such as values of attributes or parameters, general environmental statistics such as number of records, amount of available memory, current system workload, among any statistics capable of being evaluated by a conventional query optimizer, including combinations of all of the above, may be used. The invention therefore should not be limited to any particular performance criterion described herein.

The invention also defines a unique data structure for storing a query that includes a plurality of implementations of at least a portion of a query, and at least one performance criterion that selects one of the plurality of implementations to execute during execution of the query. Also consistent with the invention, an apparatus, program product and method are provided for generating such a query data structure.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 5A–5D illustrate an exemplary implementation of a query in an exemplary database in the computer system of FIG. 1.

FIGS. 6A–6C illustrate an alternate index probe implementation to that of FIGS. 5A–5D.

FIG. 10 is a block diagram of an exemplary plan stack generated by the optimize query routine of FIG. 9.

FIG. 11 is a block diagram of an exemplary query tree generated by the optimize query routine of FIG. 9.

FIG. 12 is a flowchart illustrating the program flow of an absolute_position( ) method on a switch node consistent with the invention.

FIG. 13 is a flowchart illustrating the program flow of an execute( ) method on a switch node consistent with the invention.

DETAILED DESCRIPTION

The embodiments discussed hereinafter utilize a dynamically-evaluated performance criterion to select, during runtime, an optimal plan for implementing at least a portion of a query in a database management system. However, prior to a discussion of a specific implementation of such dynamic performance evaluation and query optimization functionality, a brief discussion will be provided regarding an exemplary hardware and software environment, and an exemplary object-oriented query model, within which dynamic performance evaluation and query optimization can be implemented. As will become more apparent below, however, it will be appreciated that the herein-described functionality may be utilized in environments other than that described below. Therefore, the invention is not limited to the particular environments described herein.

Hardware/Software Environment

Figure 1:
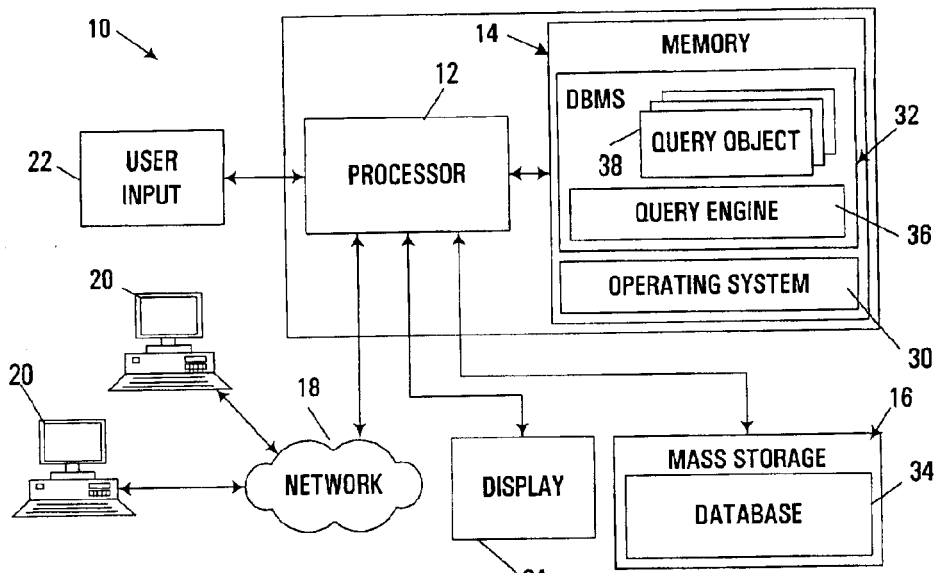
FIG. 1 is a block diagram of a computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating dynamic performance evaluation and query optimization functionality consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Object-Oriented Query Model

As discussed above, various embodiments of the invention may be implemented within a database management system (DBMS) incorporating an object-oriented query model. As shown in FIG. 1, for example, a database management system 32 may be used to access a database 34, representing a data space, with database management system 32 including a query engine 36 configured to execute database queries that are implemented using one or more query objects 38.

Figure 2:
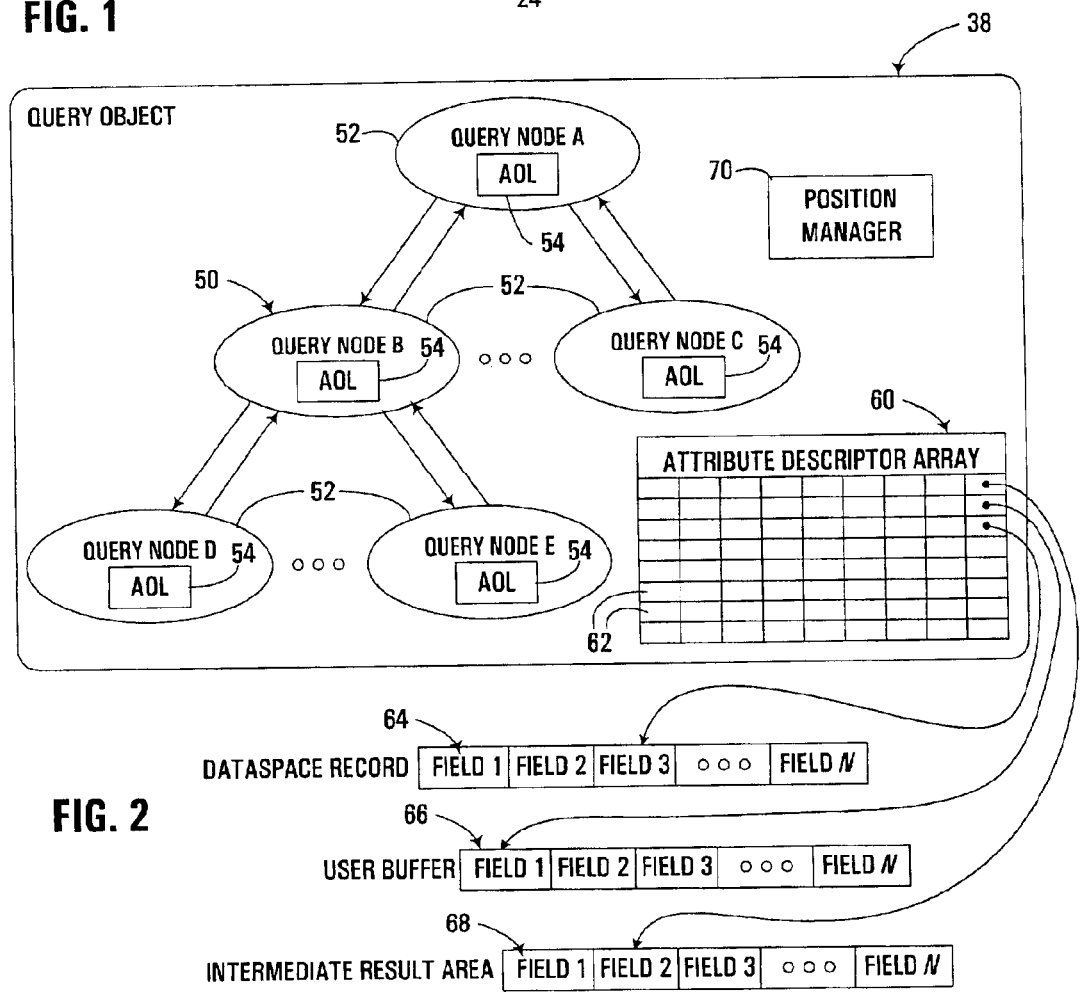
FIG. 2 is a block diagram illustrating the principal architecture of an exemplary query object from the computer system of FIG. 1.

FIG. 2 illustrates an exemplary implementation of a query object 38, capable of being executed by query engine 36 of FIG. 1. A query object generally includes a query execution tree 50 packaged with an attribute descriptor array 60. Moreover, the query object typically includes a number of methods capable of performing specific operations relevant to management of the query object and the execution of a query represented by such an object, as will be described further hereinafter.

In addition, a query object 38 may also include a position manager 70 that incorporates locking information for ensuring data integrity and preventing race conditions, which is particularly useful in connection with parallel execution of queries. Position manager 70 also performs various additional functions such as transaction processing and commitment control. Alternate functionality may be implemented with a query object consistent with the invention.

Query execution tree 50 supports the definition of an entire query in a tree structure, where a plurality of query nodes 52 are organized such that operations are performed in a generally bottom-up manner, whereby each parent node operates on the result data returned from its respective child node(s). In addition, sibling nodes that share a common parent will typically be executed in a nested manner from left to right, so that execution of one node that is to the right of another node is nested within the execution of the other node. In other environments, however, other orders of execution of the various nodes in a tree may be used.

Each query node 52 typically incorporates the logic (algorithms) required to perform specific tasks in connection with a query. To define these tasks, each query node typically includes one or more attribute operation lists (AOL's) 54, that define certain operations to be performed by that node. However, in some embodiments, attribute operation lists may not be disposed within each query node, particularly where a particular node operates in a predefined manner on the result data returned by its child nodes, and without regard for the specific results returned by those nodes. In such instances, the operations of such nodes may be hard-coded for greater performance and efficiency.

Attribute descriptor array 60 defines the fields that are operated upon by a query. The array defines a vector of attribute descriptors 62 that describe a particular field utilized in a query. Each attribute descriptor 62 also contains a reference to the actual field.

As will become more apparent below, each attribute descriptor can reference practically any data accessible to a database engine. For example, an attribute descriptor can reference a field 64 in a data space record, i.e., a table entry in the database. In the alternative, an attribute descriptor can reference a field 66 in a user buffer, i.e., the result buffer into which results are ultimately deposited. Moreover, an attribute descriptor may reference a field 68 in an intermediate result area, which functions as a working space or temporary storage utilized during execution of a query, and which may be used to store support information such as constants and temporary variables.

Figures 3, 4:
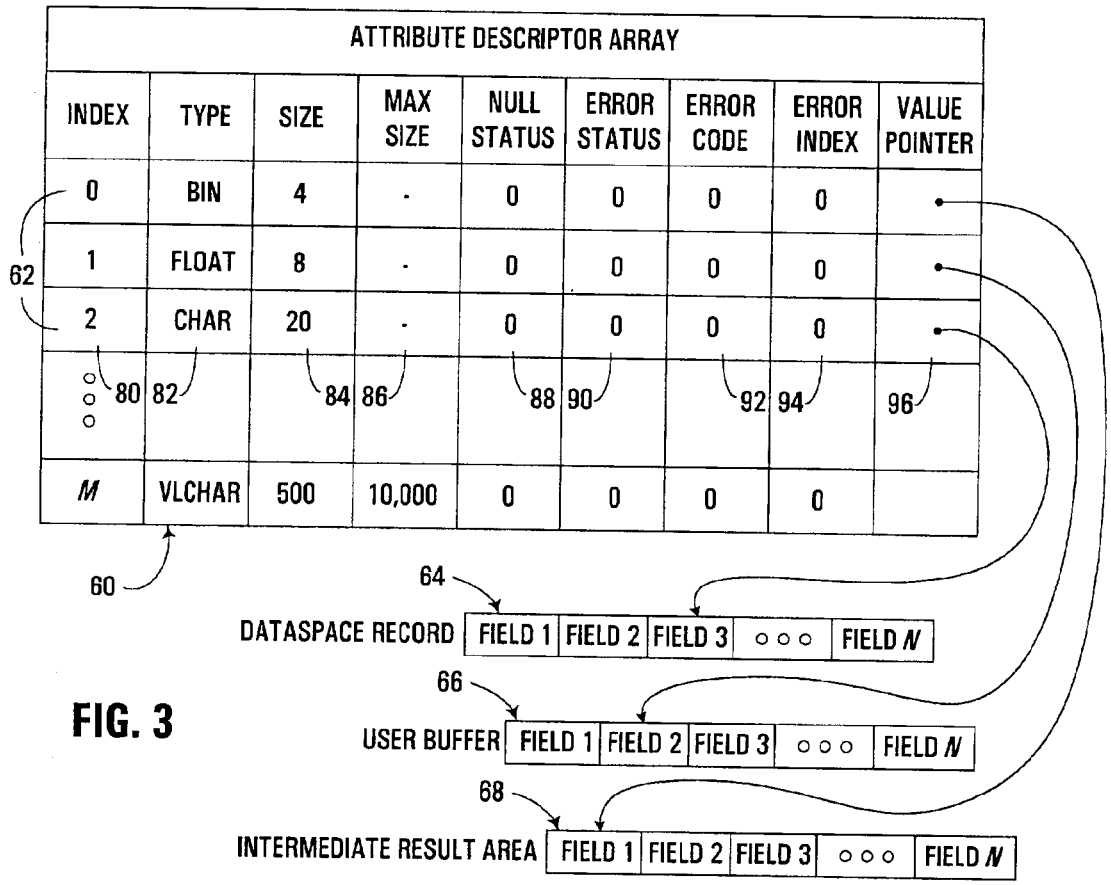
FIG. 3 is a block diagram of an exemplary attribute descriptor array from the query object of FIG. 2.
FIG. 4 is a block diagram of an exemplary attribute operation list from the query object of FIG. 2.

FIG. 3, for example, illustrates an exemplary attribute descriptor array 60 including a plurality of entries 62 defining attribute descriptors for various types of attributes. Each entry 62 includes a plurality of fields 80–96, which describe a particular type of attribute. Field 80 stores an index into the attribute descriptor array, and is used to locate a particular attribute in the array. Field 82 stores a data type, representing the type of data contained by the field. Fields 84 and 86 respectively store the size and maximum size (if appropriate) of a particular field. Fields 88, 90, 92 and 94 respectively store a null status flag, an error status flag, an error code and an error index that points to the source of an error.

Field 96 stores a reference to a particular field in the data space, user buffer or intermediate result area to be operated upon during execution of the query. As will become more apparent below, the reference stored in field 96 for a particular described attribute may be updated during execution of the query to point to appropriate fields in records being operated upon by the query. As a result, during the execution of a query, the references associated with each attribute descriptor are typically updated continuously as new records are processed by the query.

It should be appreciated that different status and attribute description information may be stored in each entry 62 or array 60. Moreover, other data structures may be used to represent the attributes to be acted upon by a query. Therefore, the invention is not limited to the particular collection of descriptor information illustrated in FIG. 3.

FIG. 4 illustrates an exemplary attribute operation list 54. An attribute operation list defines one or more attribute operations that manipulate and/or compare attribute descriptors in an attribute descriptor array. An attribute operation list typically contains all of the data manipulation and comparison logic required to do one iteration of work. Typically, such attribute operation lists are interatively executed to process a set of records in the context of executing a query.

Typically, an attribute operation list, when executed, is passed a parameter that identifies the current database record upon which to perform the predetermined operation. Functionality defined within methods capable of being called in the attribute operation list is used to update the attribute descriptor array entries to point to the appropriate fields in the current database record, the intermediate result area and/or the user buffer, such that the references in the attribute descriptor array can be utilized in executing the attribute operation list.

As shown in FIG. 4, an attribute operation list 54 therefore includes a plurality of attribute operation entries 100, each including a field 102 storing an index or pointer to that operation, a field 104 storing the type of operation, and a field 106 storing the precise logic to execute for that operation. While in the discussion herein, the attribute operation data structure is described as a list or array, it should be appreciated that such a data structure may be implemented in a number of alternate manners, e.g., via a tree or graph of linked attribute operation objects, as described in the aforementioned Carlson II application.

The operation type field 104 may store various types of operation categories, including, for example, logic types, binary types, set attribute descriptor types, ternary types, etc.

In addition, an innumerable number of logic operations may be defined in each field 106. Moreover, this logic may be represented in any number of manners, including script, executable code, interpreted code, etc.

In the exemplary attribute operation list illustrated in FIG. 4, for example, the operation used to implement the logic "IF (((A=B) OR (C>D)) OR ((E=F) AND (G<H)) THEN A=A+B)" is illustrated in the entries 100 having indices of 0–4. In this example, the parameters A, B, C, D, E, F, G and H each represent pointers to attribute descriptor entries in the attribute descriptor array, with these attribute descriptors initially set to point to appropriate fields in the data space, user buffer and/or intermediate result area to perform the given attribute operation logic upon a number of fields.

Given the wide variety of tasks that may be performed in the operation of a query, it will be appreciated that an innumerable number of statement types, commands, program flow commands, etc., may be stored within an attribute operation list consistent with the invention. Moreover, various manners of implementing the logic in an attribute operation list may be used. For example, in the illustrated implementation, live execution of virtual objects may be used. Further detail on one desirable implementation of attribute operation lists is provided, for example, in the aforementioned Carlson II application.

In other embodiments, the attribute operation list logic may be implemented in other manners, e.g., via interpretive code. Given the innumerable number of manners that attribute operation list logic could be implemented, the invention is not limited to the particular implementations discussed herein.

Figure 5A:
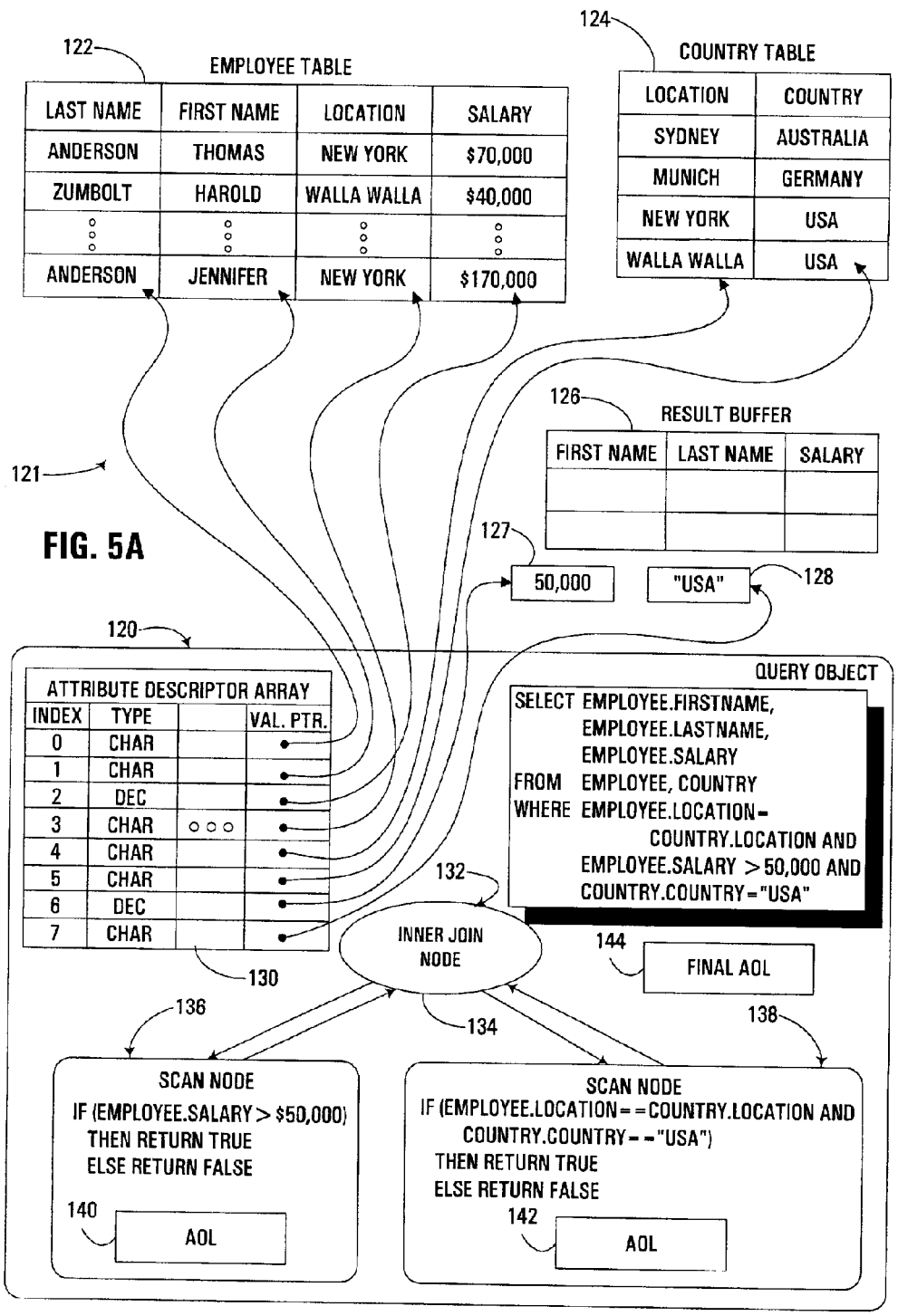

Turning next to FIGS. 5A–5D, an exemplary implementation of a query using the herein-described database management system is shown. In particular, FIG. 5A, illustrates an exemplary query object 120 suitable for performing a query on an exemplary database 121.

Assume, for the purposes of this example, that database 121 includes, in part, an Employee table 122 and a Country table 124. The Employee table 122 includes fields for Last Name, First Name, Location, and Salary for each employee, while the Country table 124 includes fields for Location and Country.

Assume also that a user wishes to find all employees who make over $50,000 per year, and who live in the United States, and to display the first and last names and salaries of those matching employees.

Query object 120 as illustrated may be used to perform the user's desired query, and return the results in a result buffer 126. To this extent, query object 120 includes an attribute descriptor array 130 and a query execution tree 132. It should be noted that the attribute descriptor array is global with respect to the nodes within tree 132, and thus is capable of being used for communication between the various nodes in the tree.

Array 130 includes attribute descriptor entries at indices 0, 1, 2 and 3 that respectively point to the Last Name, First Name, Salary and Location fields in a current row in table 122, and attribute descriptor entries at indices 4 and 5 that respectively point to the Location and Country fields in a current row in Country table 124. The attribute descriptor entries at indices 6 and 7 point to a pair of constants 127 and 128 (e.g., stored in an intermediate result buffer) required to implement the query.

Tree 132 includes three nodes, an inner join node 134 and a pair of scan nodes 136, 138, each including a corresponding attribute operation list 140, 142. Together, these nodes implement the SQL statement:

SELECT Employee.FirstName, Employee.LastName, Employee.Salary
 FROM Employee, Country
 WHERE Employee.Location=Country.Location AND
  Employee.Salary>50,000 AND
  Country.Country="USA"

Scan nodes 136 and 138 respectively implement scans of the Employee and Country tables 122 and 124. Scan node 136 attempts to locate a next record in Employee table 122 where the Salary field is greater than $50,000, while scan node 138 attempts to determine whether the Location field of a matching record returned by scan node 136 has a corresponding record in the Country table with a Country field matching "USA".

FIG. 5B illustrates in greater detail the basic logic implemented in inner join node 134. The logic in node 134 (which is illustrated in the figure in pseudocode form) may be hard coded, or in the alternative, may incorporate an attribute operation list if desired.

As shown in FIG. 5B, the inner join node has data members including pointers to the left and right child nodes (here scan nodes 136 and 138), as well as an additional flag used by the node logic represented thereafter in the figure. The logic principally operates by calling PositionNext( ) and Execute( ) methods on the left and right child nodes in a nested manner, and using a PositionBeforeStart( ) method on scan node 138 to reset a record pointer to the Country table 124 upon each successful location of a record matching the criterion for Employee table 122 upon execution of scan node 136.

Returning briefly to FIG. 5A, to populate a result buffer using the records selected by query execution tree 132, query object 120 may incorporate program code, e.g., in the form of a "final" attribute operation list 144, which typically may be executed for each record selected by query execution tree 132 to populate the result buffer with the desired fields for the selected record (e.g., for the example query above, the FirstName, LastName and Salary fields). An AOL 144 may incorporate, for example, a sequence of mapping operations to map fields from a selected record to appropriate locations in the result buffer.

Figure 5C:
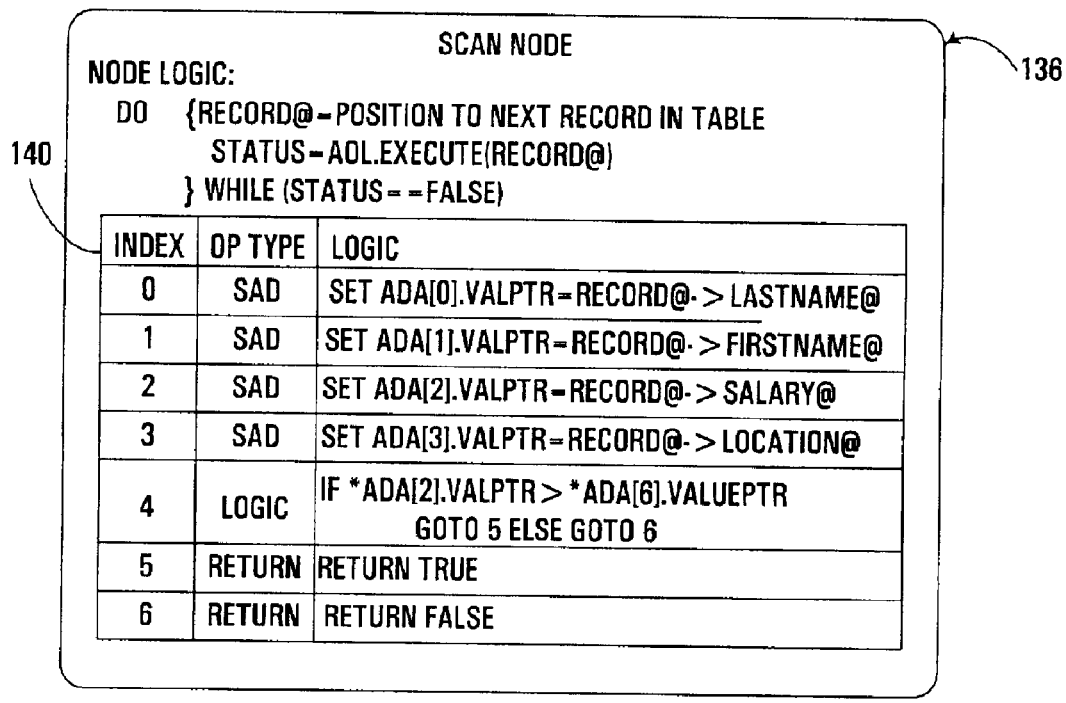
Figure 5D:
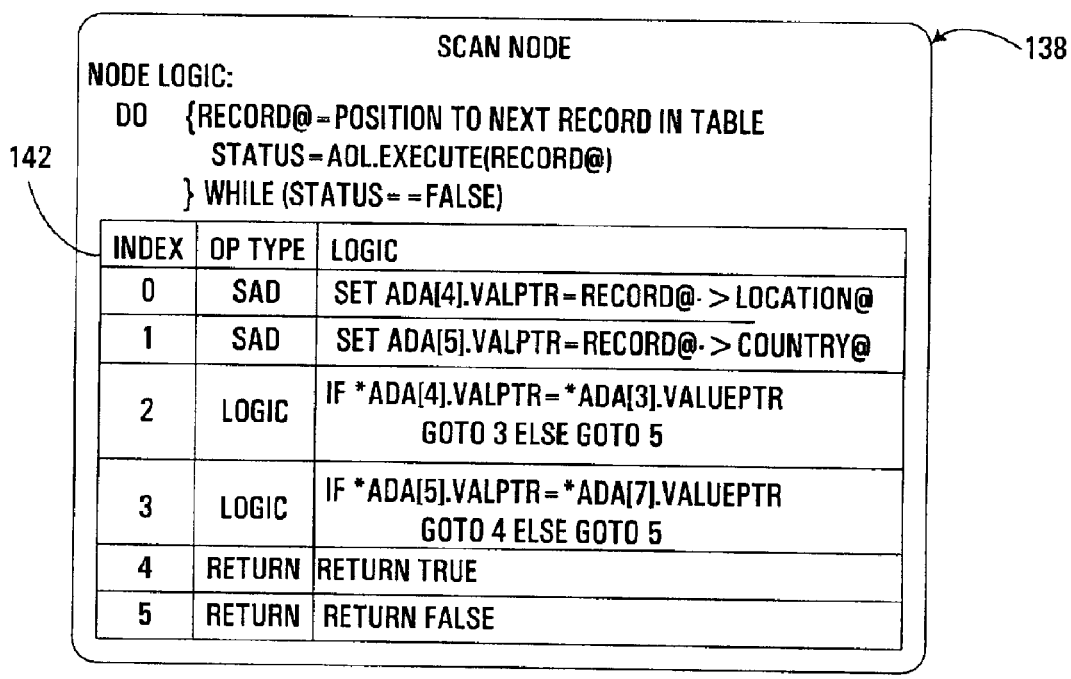

As shown in FIGS. 5C and 5D, scan nodes 136 and 138 incorporate essentially the same hard coded logic to repeatedly invoke an Execute( ) method on the respective attribute operation list 140, 142 to locate a next record matching the defined criterion. Thus, the functionality of these nodes is distinguished principally by the configuration of the respective attribute operation lists 140, 142. As a consequence, it may be appreciated that a generic dataspace scan node object may be adapted to implement a particular dataspace scan operation on a table with relatively little effort, simply through the construction of an attribute operation list performing the appropriate actions for the dataspace scan operation. Doing so allows for a reasonable set of total nodes to be defined and supported by a query engine, but still allows for very tailored and efficient nodes performing very specific tasks.

As shown in FIG. 5C, attribute operation list 140, at indices 0–3, performs Set Attribute Descriptor (SAD) operations to set the value pointer (VALPTR) fields of the attribute descriptors at indices 0–3 of array 120 (ADA[0]–ADA[3]) to point to the Last Name, First Name, Salary and Location fields of a current row or record in Employee table 122. Index 4 of list 140 is a Logic statement that tests whether the Salary field of the current record (now pointed to by ADA[2]) is greater than the constant stored in ADA[6] (here, constant 127), and that passes control to the statements at either of indices 5 and 6 based upon the result. Indices 5 and 6 are Return statements that return either a "true" or "false" status to the node logic.

As shown in FIG. 5D, attribute operation list 142, at indices 0–1, performs Set Attribute Descriptor (SAD) operations to set the value pointer (VALPTR) fields of the attribute descriptors at indices 4–5 of array 120 (ADA[4] –ADA[5]) to point to the Location and Country fields of a current row or record in Country table 124. Index 2 of list 142 is a Logic statement that tests whether the Location field of the current record in the Country table (now pointed to by ADA[4]) matches the Location field of the current record in the Employee table (now pointed to by ADA[3]). Index 3 of list 142 is a Logic statement that tests whether the Country field of the current record in the Country table (now pointed to by ADA[5]) matches the constant stored in ADA[7] (here, constant 128). If both conditions are met, control will pass to index 4 to return a "true" result, otherwise, a "false" result will be returned as a result of control passing the index 5.

It will be appreciated that FIGS. 5A–5D illustrate a relatively simple example of a query implementation using the aforementioned query object model. However, it will equally be appreciated that implementation of more complex queries occurs in much the same manner as described in connection with the aforementioned figures.

It will be appreciated by one of ordinary skill in the art having the benefit of the instant disclosure that the aforementioned query object model provides a highly extensible, flexible and powerful model for creating database queries, and having many of the benefits afforded by object-oriented concepts. Through the provision of appropriate libraries of attribute descriptor arrays, attribute operation lists, query nodes, query execution trees and/or query objects, new database queries can be rapidly assembled from pre-existing structures, and pre-existing structures can be modified or extended as necessary to support new functionality and data structures, without affecting the functionality of other structures.

In the illustrated embodiment, it may be desirable to incorporate a number of different types of query nodes into a library for use in constructing query objects. The various types of nodes may include, for example, unary nodes (nodes that have single child nodes, and that control the flow of execution to those child nodes), binary nodes (nodes that have two child nodes, and that control the flow of execution to those child nodes), leaf nodes (nodes without any children nodes, and typically constructed to access a given native or query data source), and join-type nodes (binary nodes that perform join operations using the results of two child nodes). It should also be appreciated that, in many instances, the children of a particular node may themselves incorporate one or more children, such that, for example, a unary node may have a single child node that is, itself, the root of a subtree comprising multiple nodes.

In addition, typically only leaf nodes need be bound to a given data source at construct time. Other node types may be configured to access data items from data sources by referencing appropriate attribute descriptors in an attribute descriptor array, and using attribute operations as defined in a node's attribute operation list(s).

In the illustrated embodiment, nodes of all such types may be based upon a base node class that define's a standard set of return statuses (e.g., False, Error, Null, True, Interrupt Pending, Exceptions, Lock Failure, etc.), a set of statistical outputs (e.g., cycle counts, instruction counts), a node number or identifier that uniquely identifies each node within a tree of nodes, as well as various virtual methods that may be accessed by other nodes (e.g., to provide functions such as position before start, position after end, validate, refresh, position before, position after, position next and execute, position previous and execute, resume, cleanup, etc.

As an example of the various types of unary nodes that may be desirable to incorporate into a library, collections of any or all of the following nodes may be supported in the illustrated embodiment:

Aggregate Node—Used to perform an aggregation of data provided from a child node or subtree. Assumes a child node provides the data in a group-by order. An aggregate node may have three different attribute operation lists (AOL's), one to initialize the current group, one to perform per group entry processing, and a final one to perform end of group processing.

Logic Node—Incorporates an attribute operation list that is run when its child node returns true.

Dsp Probe Node—Used to randomly access a table. May contain a reference to a Relative Record Number (RRN). Typically would have an index access node as its child node that sets the RRN. A Dsp Probe Node may call its child node first and then execute its own AOL.

Sort Node—Used to sort data provided by its child node.

IO Node—Used to perform I/O operations against a data source. Typically would have the data source as its child node. May have derived classes to be used in conjunction with specific data sources (i.e., dataspace, hash tables, bitmaps, etc.), and/or how those datasources will be accessed. Subtypes may include a Dsp IO Sequential node that can be used in conjunction with a Dsp Scan Node, a Dsp IO Random node that can be used with a Dsp Probe Node, and a Din Random IO Node that buffers dataspace key values and rows. Providing I/O in separate nodes may provide greater flexibility to perform I/O, although in other embodiments, I/O operations may be incorporated into the same nodes.

Cache Node—Used to keep a cache of values around for reuse to avoid rerunning a child node and its underlying nodes. Each entry may have a key and the data for all attributes normally contributed by the underlying nodes. It may be desirable to include multiple types of cache nodes, e.g., one that eliminates duplicate values, another that contains all occurrences of a matching key.

As an example of the various types of binary nodes that may be desirable to incorporate into a library, collections of any or all of the following nodes may be supported in the illustrated embodiment:

And Node—Only returns TRUE if both child nodes return TRUE.

Or Node—Returns TRUE if either of its child nodes delivers TRUE.

UnionAll Node—Appends complete answer sets from child nodes. Typically keeps calling left child node until end of file and then calls right child node until it gives end of file. The result set contains all tuples from both subtrees.

Union Node—Combines two sorted result sets (subtrees) A and B. The result set contains all tuples from A and B, with duplicate tuples removed.

IntersectAll Node—Combines two sorted result sets (subtrees) A and B. The result set contains all tuples that are in both A and B.

Intersect Node—Combines two sorted result sets (subtrees) A and B. The result set contains all tuples that are in both A and B, with duplicate tuples removed.

Except Node—Combines two sorted result sets (subtrees) A and B. The result set contains all distinct tuples in A that are not in B.

As an example of the various types of leaf nodes that may be desirable to incorporate into a library, collections of any or all of the following nodes may be supported in the illustrated embodiment:

Dsp Scan Node—Used to implement a table scan.

Ptb Scan Node—Used to sequentially scan data from a Packed Tuple Buffer (PTB), i.e., a buffer of data.

Din Scan Node—Used to sequentially scan a dataspace index.

Pth Scan Node—Used to sequentially scan a Packed tuple hash (PTH) object (a hash table).

Pth Probe Node—Used to randomly access a packed tuple Hash object using a set of attributes as a key.

Rrn Bitmap Ods Scan Node—Used to scan an RRN bitmap and return valid RRN's allowing a parent node to access a table row.

Din List Probe Node—Used to access a dataspace index using a list of key ranges.

Din Probe Node—Used to search for a particular key value. These objects may have an Initial AOL that builds the search key value, along with an AOL that unbuilds the result key and does key selection.

Logic Leaf Node—Used to house an AOL, e.g., for an SQL statement that does not access any table.

Rrn List Ods Scan Node—Used to scan through an RRN list and return valid RRN's allowing a parent node to access a table row.

As an example of the various types of join-type nodes that may be desirable to incorporate into a library, collections of any or all of the following nodes may be supported in the illustrated embodiment:

Subquery Node—Used for a subquery case where the node returns a TRUE result if there is one hit from the right hand child node. On subsequent calls to the node, it will always go to the left hand child. Functions like a Distinct Inner Join.

Exception Join Node—Calls left child and if that returns TRUE, it calls right child. If right child returns TRUE, the left child is called again. If the right child returned FALSE, an AOL is called that will line up on the default record.

Inner Join Node—Calls left child, and if TRUE, calls right child. FALSE from left child causes this node to return FALSE. A FALSE from right child causes this node to recall its left child.

Left Outer Join Node—Calls right child after TRUE from left child and runs an AOL to position to the default row if the right child returns FALSE. If the right child returns TRUE, no AOL is run, and this node returns TRUE.

In addition, it may also be desirable to incorporate additional functionality, e.g., to support parallelism during query execution through the use of query buffers, as described in the aforementioned Carlson I application, or to support runtime query optimization, as described hereinafter.

As an example of the extensibility of the herein-described query model, consider the aforementioned exemplary query object illustrated in FIGS. 5A–5D. As discussed above, the query object implements a database query that returns the first and last names and salaries of all employees in a database who make over $50,000 per year, and who live in the United States. In doing so, the exemplary query object utilizes scan nodes to query employee and country tables in the database.

Suppose for the purposes of the example that a query optimizer determines through cost analysis that the most efficient way to implement the query would be to perform an index probe of the country table in lieu of scanning the table as is performed by the query object of FIGS. 5A–5D. To do so, an alternate query object may be constructed using many of the same components as are illustrated in FIGS. 5A–5D, but with an "index probe node" used in place of scan probe 138.

FIG. 6A, for example, illustrates an exemplary index probe node 138' that may be used in an alternate query object to that of FIGS. 5A–5D, to implement essentially the same database query. In this alternate node 138', an essentially empty AOL 142' is used, with the selection functionality implemented within the index probe node itself. In other embodiments, an AOL may be used to implement the desired functionality, e.g., when selection is needed on non-leading key fields.

To implement an index probe, node 138' includes an xIndex pointer to an index that has been built over the country table, created via an SQL statement such as "CREATE INDEX Country_Index ON Country_Table (Location, Country)", and having a key format of (Location, Country). Node 138' also includes an xAOL pointer to the empty AOL 142' in the node.

The node logic for node 138' simply executes a "find next" method on the index, which returns a TRUE result upon locating another matching key in the Country table, or FALSE once no more matching keys are located.

To support the inclusion of node 138' in a query object, it may be necessary to modify other components in the object. For example, FIG. 6B illustrates an alternate attribute descriptor array 130' to that of FIG. 5A, which differs to the extent that no entry for Country.Location is required in array 130', and that an additional entry referencing a key build buffer is used (ADA[7]). In addition, as shown in FIG. 6C, an AOL 140' may be incorporated into scan node 136 of FIG. 5C, as an alternative to AOL 140. AOL 140' differs to the extent that, upon finding a matching record in the Employee table, a key build of the Location and Country fields of the Country table is performed at indices 5 and 6 of AOL 140'.

It will be appreciated that the creation of the aforementioned structures and their incorporation into a database management system, as well as the creation of a database engine and development environment suitable for both executing queries and developing new queries, would be well within the capabilities of one of ordinary skill in the art having the benefit of the instant disclosure. Moreover, it will be appreciated that any of the modifications and variations discussed in the aforementioned Carlson I, II, and III applications may also be incorporated into the various embodiments discussed herein.

It will further be appreciated that the herein-described object-oriented query model is merely exemplary in nature, and that the invention may be implemented in database management system using other object-oriented query models, as well as in other, non-object-oriented database management systems. Therefore, the invention is not limited to use solely in the particular database management system architecture described herein.

Runtime Query Optimization Based upon Runtime-Evaluated Performance Criterion

To implement runtime query optimization, a runtime-evaluated performance criterion is utilized to dynamically select one of a plurality of available query implementations, or plans, to implement a portion of a query. In the illustrated embodiment, such runtime query optimization is utilized in connection with the aforementioned object-oriented query model, and as such, the description hereinafter will focus on such an implementation. However, one of ordinary skill in the art having the benefit of the instant disclosure would be able to implement runtime query optimization in database management systems that rely on other query models without undue experimentation.

Figure 7:
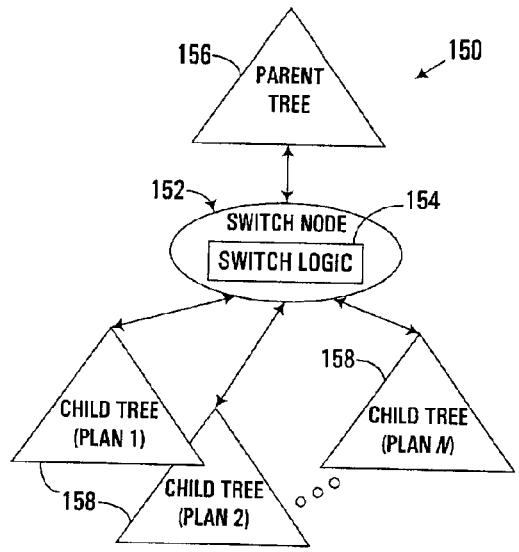
FIG. 7 is a block diagram of a query tree incorporating a switch node suitable for performing dynamic performance evaluation and query optimization consistent with the invention.

In the illustrated implementation, runtime query optimization is implemented using one or more switch nodes, embedded in a query tree, and capable of dynamically evaluating a performance criterion during execution of a query, and then selecting from among a plurality of plans based upon the evaluation of such criterion. Other query operations may be performed precedent or subsequent to the execution of a plan by a switch node, so the selection of a plan to implement a query need not necessarily select a plan that handles the entire query. As shown in FIG. 7, for example, an exemplary query tree 150 is illustrated, including a switch node 152 that incorporates switch logic 154 therein to dynamically evaluate a performance criterion. Switch node 152 is shown descending from a parent tree block 156 that may represent practically any form of query logic, e.g., any combination of nodes suitable for implementing a portion of a query.

Descending from switch node 152 are two or more child tree blocks 158, representing the available plans, or implementations for a portion of the query that is selected by the switch node. Each child tree block 158 can including practically any form of query logic, e.g., any combination of a nodes suitable for implementing a desired portion of a query. However, it should be appreciated that all of the child tree blocks 158 descending from switch node 152 are typically configured to perform the same basic query logic, as each represents alternate implementations of the same query logic.

It should also be appreciated that further query logic may be implemented subsequent to the execution of one of child tree blocks 158, so that, after a plan is selected and its logic executed, other logic is executed regardless of what plan was been selected by the switch node.

Switch logic 154 in switch node 152 may be implemented in a number of manners to evaluate a performance criterion and select a plan therefrom during execution of the query. For example, switch logic 154 may be implemented using an attribute operation list (AOL) as described above. Other execution logic, including interpretive code, directly executable code, or the like, may be used in the alternative.

A wide variety of performance criteria may be utilized to aid in runtime query optimization consistent with the invention. Statistics such as values of attributes or parameters, general environmental statistics such as number of records, amount of available memory, current system workload, as well as any statistics capable of being evaluated by a conventional query optimizer, may be used. Moreover, any number of combinations of statistics may be evaluated, and statistics may also be based upon data gathering over time. Tests may also incorporate practically any decision logic known in the art. The invention therefore should not be limited to any particular performance criterion described herein.

Figure 8:
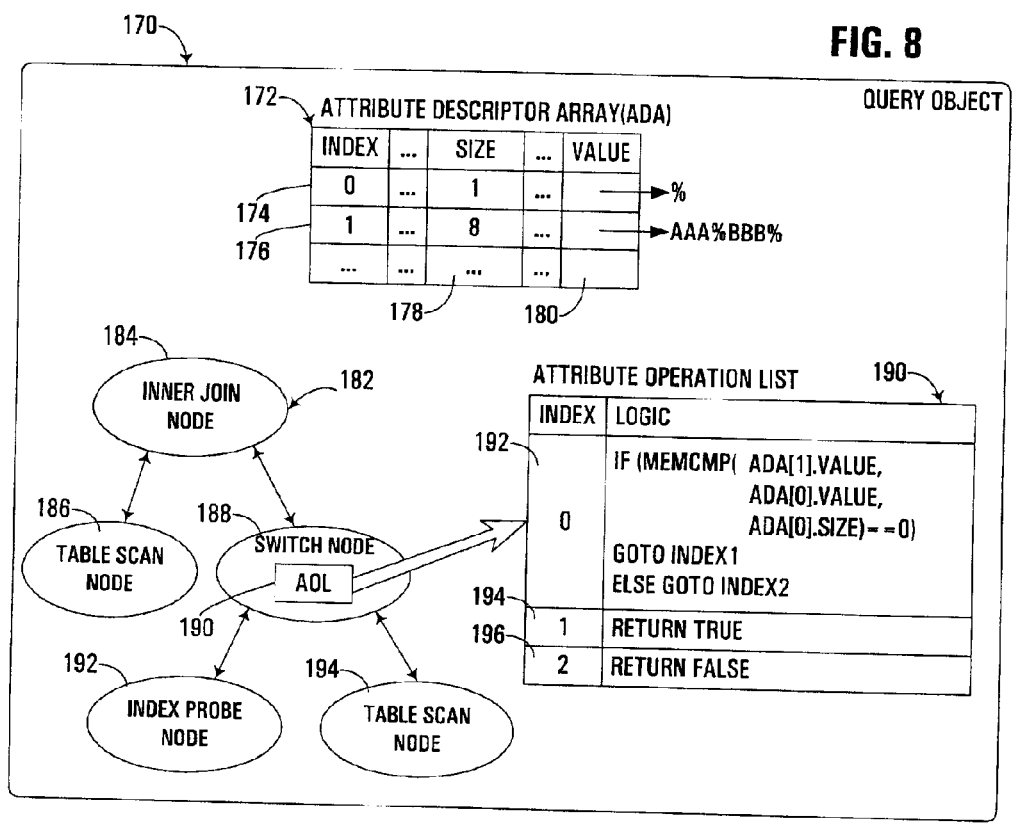
FIG. 8 is a block diagram of an exemplary implementation of a switch node in a query object of the type illustrated in FIG. 2.

FIG. 8 next illustrates an exemplary query object 170 utilizing a switch node consistent with the invention. Query object 170 in this example implements a relatively simple query, an inner join operating upon selections made on two tables, where the selections are processed by left and right child nodes descending off of an inner join node. It will also be assumed for the purposes of this example that the right child selection is amenable to execution using either an index probe or a table scan based upon a performance criterion that involves a runtime-derived parameter.

Shown within query object 170 is an attribute descriptor array 172 including entries 174, 176, each of which including a size field 178 and value field 180 that respectively store the current size and a reference to the specific value for the associated attribute. Other fields and entries in the attribute descriptor array 172 have been omitted for clarity.

Query object 170 also includes a query tree 182 including an inner join node 184 having a left child node 186 implemented as a table scan node, and a right child node implemented as a switch node 188 incorporating an attribute operation list 190, with alternate plans for representing a given portion of a query represented by an index probe node 192 and table scan node 194 descending from switch node 188. In this regard, it will be appreciated that nodes 184 and 186 correspond generally to the parent tree object 156 of FIG. 7, while nodes 192 and 194 generally correspond to child tree objects 158 of FIG. 7.

An attribute operation list is shown including three entries 192, 194 and 196, and which when executed returns either TRUE or FALSE based upon the result of a c language MEMCMP( ) operation.

The attribute operation list therefore implements the switch logic for switch node 188, within which dynamic evaluation of the performance criterion is performed.

Figure 9:
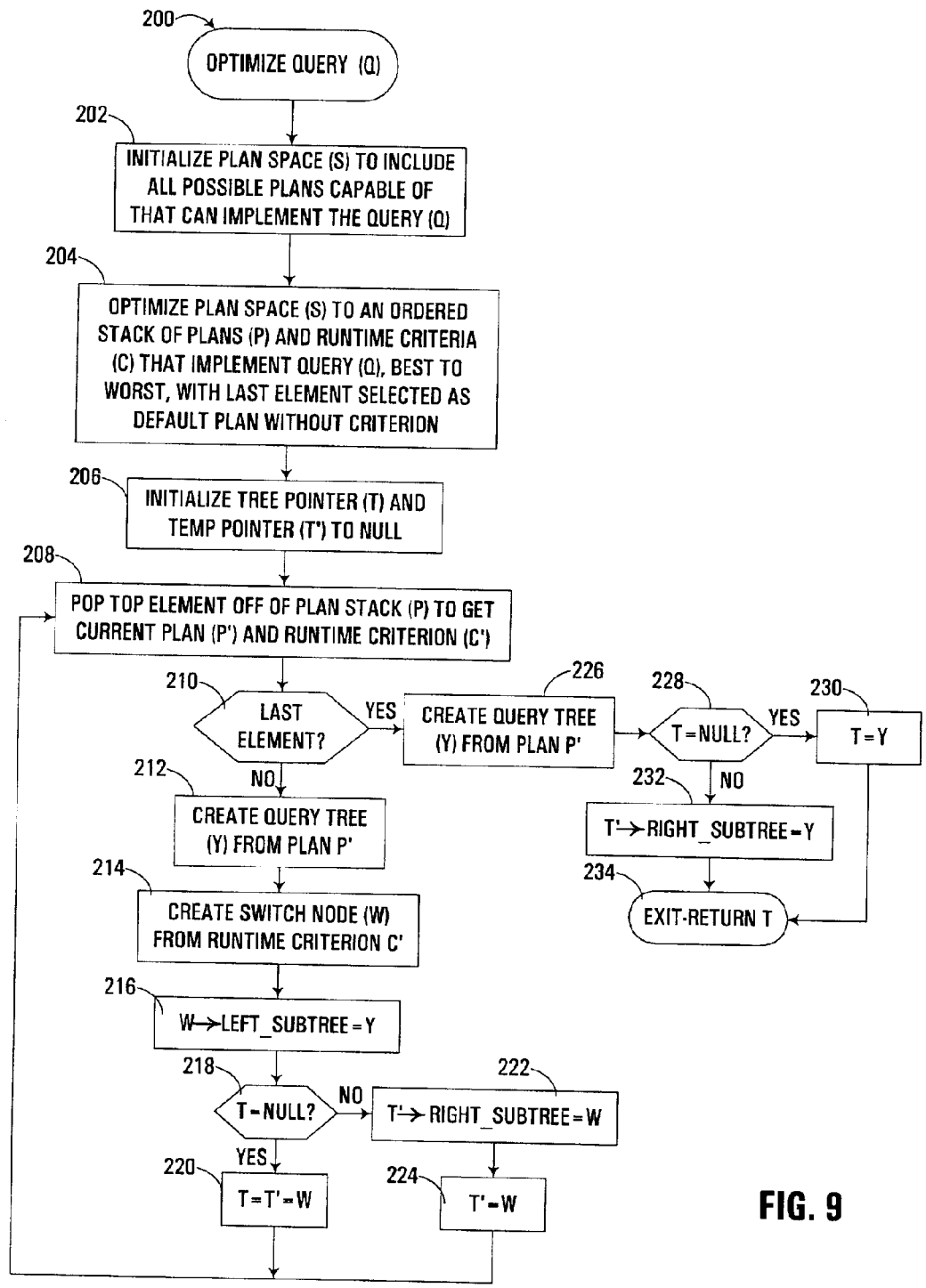
FIG. 9 is a flowchart illustrating the program flow of an optimize query routine that may be executed by a query optimizer during optimization of a query.

To generate a query object such as query object 170 of FIG. 8, a query optimizer may be used, including support for generating a switch node and the appropriate alternate implementations to be called in response to different dynamically generated results of the performance criterion associated with such switch node. FIG. 9, for example, illustrates an optimize query routine 200 that may be executed by a query optimizer during optimization of a portion of a query. Routine 200, in particular, may be executed when it is determined that a particular portion of a query, here represented as query "Q", may be implemented using multiple plans in different circumstances.

Routine 200 operates by parsing a plurality of plans into a sequence of binary switch nodes that return TRUE or FALSE values in response to particular performance criterion, and select therefrom either left or right child nodes to execute. For each switch node, a TRUE result executes a plan, while a FALSE result passes control to another switch node. The last switch node, if a FALSE result is obtained, executes a default plan. In the alternative, a single switch node could select among more than two plans, and thus provide the ability for more than two plans to descend from a single switch node.

Routine 200 begins in block 202 by initializing a plan space (S) to include all possible plans capable of implementing a particular query (Q). Next, block 204 optimizes the plan space (S) to create an ordered stack of plans (P) and runtime criteria (C) that are capable of implementing the query (Q). The ordered stack is typically ordered best to worst, with the last element selected as a default plan, having no specific criterion associated therewith. In the alternative, each plan may be associated with a criterion, whereby no default criterion may be used.

Turning briefly to FIG. 10, an exemplary plan stack (P) is illustrated at 240, including a plurality of plans, denoted as $PLAN_1$, $PLAN_2$, and $PLAN_3$ associated with criterion $C_1$, $C_2$ and $C_3$, and with a default plan $PLAN_{DEF}$ provided as a default to the plan stack, but not associated with any particular criterion. It is assumed that $PLAN_1$, $PLAN_2$, and $PLAN_3$ progress from best to worst in order in the plan stack.

Returning to FIG. 9, once a plan stack (P) is created in block 204, block 206 initializes a tree pointer (T) and a temporary pointer (T') to NULL values. Next, a loop is initiated in block 208 to process each element in the plan stack (P). Specifically, block 208 pops the top element off of the plan stack (P) to obtain a current plan (P') and runtime criterion (C'). Next, block 210 determines whether the popped element is the last element in the stack. If not, control passes to block 212 to create a query tree (Y) that implements current plan (P'). Next, block 214 creates a switch node (W) that implements the current runtime criterion (C'). Next, block 216 sets a left_subtree pointer for the switch node (W) to point to the newly-created query tree (Y), thus setting the newly-created query tree as the left child node for the switch node.

Next, block 218 determines whether tree pointer (T) is set to NULL. If so, control passes to block 220 to initialize both the tree pointer (T) and the temporary pointer (T') to point to switch node (W), as it is assumed that the switch node is the root node for this query (which may be only a portion of a larger query, as discussed above). Control then returns to block 208 to process additional elements.

Returning to block 218, if tree pointer (T) is not NULL, control passes to block 222 to set a right_subtree pointer on the node pointed to by temporary pointer (T') to point to switch node (W), thus appending the switch node as the right child of any pre-existing parent tree. Block 224 then updates the temporary pointer (T') to point to switch node (W). Control then returns to block 208 to process additional plan stack elements.

Returning to block 210, once the last element has been popped off of the plan stack (P), block 210 passes control to block 226 to create a query tree (Y) from the current plan (P'), much as is done in block 212. Block 228 then determines whether tree pointer (T) is NULL. If so, tree pointer (T) is set to point to the newly-created query tree (Y) in block 230. Otherwise, block 228 passes control to block 232 to append the newly-created query tree (Y) as the right child node for the node pointed to by the temporary pointer (T'), by setting the right_subtree pointer on the node to point to the newly-created query tree (Y). Upon completion of either of block 230 and 232, control passes to block 234 to terminate routine 200, and return tree pointer (T) as the result, which will point to the parent switch node generated by routine 200, or alternatively the sole query tree (Y) (if only one plan was presented in the plan stack (P) upon initiation of routine 200).

FIG. 11, for example, illustrates an exemplary query tree 250 generated by routine 200 to implement the plan stack 240 illustrated in FIG. 10. As shown, query tree 250 includes an inner join node 252 and a table scan node 254 descending therefrom as a left child node. Descending as a right child node off of inner join node 252 is a subtree 255 that implements the multiple plans defined in plan stack 240. Specifically, subtree 255 includes a switch node 256 that implements criterion $C_1$, and a left child query tree 258 off of switch node 256 that implements $PLAN_1$.

Descending as the right child node of switch node 256 is another switch node 260, which incorporates switch logic that implements performance criterion $C_2$, and which includes as a left child query tree 264, which implements $PLAN_2$.

Descending as the right child of switch node 260 is a switch node 264, having switch logic that implements performance criterion $C_3$, and including as a left child query tree 266 that implements $PLAN_3$. A default query tree 268 that implements default plan $PLAN_{DEF}$ is provided as a right child node for switch node 264.

It will be appreciated that each query tree 258, 262, 266, 268, or implementation $PLAN_1$, $PLAN_2$, $PLAN_3$, $PLAN_{DEF}$, may include any type and/or collection of nodes capable of implementing the desired query functionality, and that each implementation may be relatively simple or complex in nature as desired.

FIGS. 12 and 13 next illustrate two methods capable of being executed on a switch node consistent with the invention. In particular, FIG. 12 illustrates an absolute_position( ) method 280 capable of being called on a switch node consistent with the invention. Method 280 begins in block 282 by testing the performance criterion for the switch node, typically by executing the attribute operation list for the switch node. As a result of testing the performance criterion, a TRUE or FALSE value is returned based upon whether the criterion has or has not been met. Control then passes to block 284 to either execute block 286 to set a switch state for the switch node to "LEFT" (if the criterion is met, and a TRUE value is returned from the criterion test), or to execute block 288 to set the switch state to "RIGHT" (if the criterion is not met, and a FALSE value is returned from the criterion test). Method 280 is then complete.

By setting the switch state for the switch node to "LEFT", an indication is made that the left child node (or subtree) of the switch node should be executed when the switch node is executed. Likewise, by setting the switch state for the switch node to "RIGHT", an indication is made that the right child node (or subtree) of the switch node should be executed when the switch node is executed.

As illustrated in FIG. 13, for example, an execute( ) method 290 for a switch node begins in block 292 by querying whether the switch state for the switch node is set to "LEFT". If so, control passes to block 294 to execute the left subtree of the switch node (e.g., by calling the execute( ) method on the root node of the left subtree). Otherwise, control passes to block 296 to execute the right subtree of the switch node (e.g., by calling the execute( ) method on the root node of the right subtree). Method 290 is then complete.

The absolute_position( ) method on a switch node is typically called by a parent node each iteration of an outer loop executed by the parent node, while the execute( ) method is called by the parent node on each iteration of an inner loop. For example, where the parent node is an inner join node and the switch node is the right child of the inner join node (e.g., as in FIGS. 8 and 11), the absolute position( ) method is called on the switch node after each join candidate is retrieved as a result of execution of the left subtree descending from the inner join node, to prepare the right subtree of the join (here rooted by the switch node) for join fanout execution. Then, the execute( ) method is called iteratively to execute the proper query implementation based upon the dynamically-evaluated performance criterion.

It should be noted that the aforementioned configuration not only permits the dynamic evaluation of runtime-derived parameters to be utilized in connection with selecting an optimal plan for implementing a query, but also permits the dynamic evaluation to return different results at different times. In the illustrated embodiment, for example, an absolute_position( ) method may select a different plan each time a join candidate is processed by a parent inner join node, whereby different plans may be executed at different points in the query. As such, a tremendous amount of flexibility, as well as the possibility for significant optimization, are provided by the invention.

Various modifications may be made to the illustrated embodiments without departing from the spirit and scope of the invention. Therefore, the invention lies in the claims hereinafter appended.

What is claimed is:

1. A computer-implemented method of executing a database query, the method comprising:
    (a) dynamically evaluating at least one performance criterion for a query during execution of at least a portion of the query;
    (b) selecting one of a plurality of query implementations defined in the query based upon the dynamically-evaluated performance criterion; and
    (c) continuing execution of the query using the selected query implementation;
wherein dynamically evaluating the performance criterion includes accessing a query data structure that includes the plurality of query implementations to obtain the performance criterion, and wherein continuing execution of the query includes executing the selected query implementation in the query data structure.

2. The method of claim 1, wherein the performance criterion is associated with a runtime-derived parameter.

3. The method of claim 1, wherein the performance criterion is associated with a parameter selected from a group consisting of an attribute, a record count, an environmental statistic, and combinations thereof.

4. The method of claim 1, wherein the query data structure includes a query tree having a switch node and a plurality of child nodes, the switch node configured to evaluate the performance criterion and at least one of the child nodes configured to implement at least a portion of one of the plurality of query implementations.

5. The method of claim 4, wherein the query tree includes a plurality of binary switch nodes, each binary switch node including a performance criterion, wherein each binary switch node includes a left subtree that implements one of the plurality of query implementations that matches the performance criterion.

6. The method of claim 5, wherein each binary switch node other than a last binary switch node references as its right child another of the binary switch nodes, and wherein the last binary switch node includes a right subtree that implements a default query implementation.

7. The method of claim 4, wherein dynamically evaluating the performance criterion includes executing an attribute operation list associated with the switch node.

8. The method of claim 1, wherein dynamically evaluating the performance criterion is performed during absolute positioning.

9. An apparatus, comprising:
    (a) a memory within which is resident at least a portion of a database; and
    (b) program code configured to execute a database query by dynamically evaluating at least one performance criterion for the query during execution of at least a portion of the query, selecting one of a plurality of query implementations defined in the query based upon the dynamically-evaluated performance criterion, continuing execution of the query using the selected query implementation;
wherein the program code is configured to dynamically evaluate the performance criterion by accessing a query data structure that includes the plurality of query implementations to obtain the performance criterion, and to continue execution of the query by executing the selected query implementation in the query data structure.

10. The apparatus of claim 9, wherein the performance criterion is associated with a runtime-derived parameter.

11. The apparatus of claim 9, wherein the performance criterion is associated with a parameter selected from a group consisting of an attribute, a record count, an environmental statistic, and combinations thereof.

12. The apparatus of claim 9, wherein the query data structure includes a query tree having a switch node and a plurality of child nodes, the switch node configured to evaluate the performance criterion and at least one of the child nodes configured to implement at least a portion of one of the plurality of query implementations.

13. The apparatus of claim 12, wherein the query tree includes a plurality of binary switch nodes, each binary switch node including a performance criterion, wherein each binary switch node includes a left subtree that implements one of the plurality of query implementations that matches the performance criterion.

14. The apparatus of claim 13, wherein each binary switch node other than a last binary switch node references as its right child another of the binary switch nodes, and wherein the last binary switch node includes a right subtree that implements a default query implementation.

15. The apparatus of claim 12, wherein the program code is configured to dynamically evaluate the performance criterion by executing an attribute operation list associated with the switch node.

16. The apparatus of claim 9, wherein the program code is configured to dynamically evaluate the performance criterion during absolute positioning.

17. A program product, comprising:
    (a) program code configured to execute a database query by dynamically evaluating at least one performance criterion for the query during execution of at least a portion of the query, selecting one of a plurality of query implementations defined in the query based upon the dynamically-evaluated performance criterion, continuing execution of the query using the selected query implementation; and
    (b) a signal bearing medium bearing the program code;
wherein the program code is configured to dynamically evaluate the performance criterion by accessing a query data structure that includes the plurality of query implementations to obtain the performance criterion, and to continue execution of the query by executing the selected query implementation in the query data structure.

18. The program product of claim 17, wherein the signal bearing medium includes at least one of a transmission medium and a recordable medium.

19. A computer-implemented method of generating a query data structure, the method comprising:
    (a) identifying a plurality of implementations capable of implementing at least a portion of a query; and
    (b) building a query data structure for use in implementing the query, the query data structure including the plurality of implementations and at least one performance criterion for use in selecting one of the plurality of implementations to execute during execution of the query;
wherein building the query data structure includes building a query object, the query object including a query tree having a switch node and a plurality of child nodes, the switch node configured to evaluate the performance criterion and at least one of the child nodes configured to implement at least a portion of one of the plurality of implementations.

20. The method of claim 19, wherein identifying the plurality of implementations and building the query data structure are performed during query optimization.

21. The method of claim 19, further comprising sorting the plurality of implementations to order the plurality of implementations from best to worst.

22. The method of claim 19, wherein building the query data structure includes associating a performance criterion with each of at least a subset of the plurality of implementations.

23. The method of claim 22, wherein associating the performance criterion with each of the subset of the plurality of implementations includes associating a performance criterion with every implementation except for a default implementation.

* * * * *